(12) United States Patent
Shin et al.

(10) Patent No.: US 10,348,945 B2
(45) Date of Patent: Jul. 9, 2019

(54) LIGHT FIELD IMAGE CAPTURING APPARATUS INCLUDING SHIFTED MICROLENS ARRAY

(71) Applicant: Samsung Electronics Co., Ltd., Suwon-si, Gyeonggi-do (KR)

(72) Inventors: Jungsoon Shin, Yongin-si (KR); Seungkyu Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 404 days.

(21) Appl. No.: 14/909,196

(22) PCT Filed: Apr. 28, 2014

(86) PCT No.: PCT/KR2014/003736
§ 371 (c)(1),
(2) Date: Feb. 1, 2016

(87) PCT Pub. No.: WO2015/016459
PCT Pub. Date: Feb. 5, 2015

(65) Prior Publication Data
US 2016/0191768 A1 Jun. 30, 2016

(30) Foreign Application Priority Data
Jul. 31, 2013 (KR) .......................... 10-2013-0091166

(51) Int. Cl.
*G02B 13/16* (2006.01)
*H04N 5/225* (2006.01)
(Continued)

(52) U.S. Cl.
CPC ......... *H04N 5/2254* (2013.01); *G02B 3/0056* (2013.01); *G02B 27/0075* (2013.01);
(Continued)

(58) Field of Classification Search
CPC ........... H04N 13/0217; H04N 13/0271; H04N 13/0275
(Continued)

(56) References Cited

U.S. PATENT DOCUMENTS 7,655,893 B2 2/2010 Campbell et al.
7,821,680 B2 10/2010 Min et al.
(Continued)

FOREIGN PATENT DOCUMENTS

EP 2083447 A1 7/2009
JP 4402161 B1 1/2010
(Continued)

OTHER PUBLICATIONS

International Search Report PCT/ISA/210 for International Application No. PCT/KR2014/003736 dated Aug. 14, 2014.
(Continued)

*Primary Examiner* — Anthony J Daniels
(74) *Attorney, Agent, or Firm* — Harness, Dickey & Pierce, P.L.C.

(57) ABSTRACT

A light field image capturing apparatus including a shifted microlens array, the light field image capturing apparatus including: an objective lens focusing light incident from an external object; an image sensor including a plurality of pixels, the image sensor outputting an image signal by detecting incident light; and a microlens array disposed between the objective lens and the image sensor and including a plurality of microlenses arranged in a two-dimensional manner, the plurality of microlenses corresponding to the plurality of pixels, wherein at least a part of the plurality of microlenses is shifted in a direction with respect to the pixels corresponding to the at least a part of the plurality of microlenses.

16 Claims, 2 Drawing Sheets

(51) Int. Cl.
*H04N 13/204* (2018.01)
*G03B 35/08* (2006.01)
*G02B 27/00* (2006.01)
*G02B 3/00* (2006.01)
*H04N 13/232* (2018.01)

(52) U.S. Cl.
CPC .......... *G03B 35/08* (2013.01); *H04N 13/204* (2018.05); *H04N 13/232* (2018.05); *H04N 2213/001* (2013.01)

(58) Field of Classification Search
USPC ........................................................ 348/335
See application file for complete search history.

(56) References Cited

U.S. PATENT DOCUMENTS

| | | | |
|---|---|---|---|
| 7,880,794 B2 | 2/2011 | Yamagata et al. | |
| 7,898,591 B2 | 3/2011 | Ueda | |
| 8,068,284 B2* | 11/2011 | Feng | H01L 27/14627 359/619 |
| 8,315,476 B1 | 11/2012 | Georgiev et al. | |
| 8,319,306 B2 | 11/2012 | Liu et al. | |
| 8,902,321 B2 | 12/2014 | Venkataraman et al. | |
| 2006/0187553 A1* | 8/2006 | Tanaka | H01L 27/14625 359/619 |
| 2007/0030379 A1 | 2/2007 | Agranov | |
| 2008/0007804 A1 | 1/2008 | Min et al. | |
| 2009/0027541 A1* | 1/2009 | Takayama | H01L 27/14627 348/340 |
| 2009/0122175 A1 | 5/2009 | Yamagata | |
| 2009/0140131 A1* | 6/2009 | Utagawa | G02B 3/0056 250/226 |
| 2009/0185801 A1 | 7/2009 | Georgiev et al. | |
| 2010/0033813 A1* | 2/2010 | Rogoff | G02B 27/2214 359/463 |
| 2010/0059844 A1* | 3/2010 | Tanaka | G02B 3/0056 257/432 |
| 2010/0245654 A1 | 9/2010 | Ueda | |
| 2011/0228142 A1* | 9/2011 | Brueckner | H04N 5/2254 348/241 |
| 2012/0102746 A1 | 5/2012 | Jessemey et al. | |
| 2012/0176532 A1* | 7/2012 | Hara | G03B 13/36 348/352 |
| 2013/0127002 A1* | 5/2013 | Okigawa | H01L 27/14627 257/432 |
| 2013/0278730 A1* | 10/2013 | Hasegawa | G03B 35/08 348/49 |
| 2014/0022337 A1* | 1/2014 | Putraya | H04N 5/23238 348/36 |
| 2015/0009367 A1* | 1/2015 | Kobayashi | G02B 7/34 348/240.3 |
| 2016/0133762 A1* | 5/2016 | Blasco Claret | G02B 13/0085 257/432 |

FOREIGN PATENT DOCUMENTS

| | | |
|---|---|---|
| KR | 1020080004769 A | 10/2008 |
| KR | 1020110114319 A | 10/2011 |

OTHER PUBLICATIONS

Written Opinion of the International Searching Authority PCT/ISA/237 for International Application No. PCT/KR2014/003736 dated Aug. 14, 2014.

Extended European Search Report dated Feb. 14, 2017 issued in corresponding European Application No. 14832202.7.

* cited by examiner

[Fig. 1]
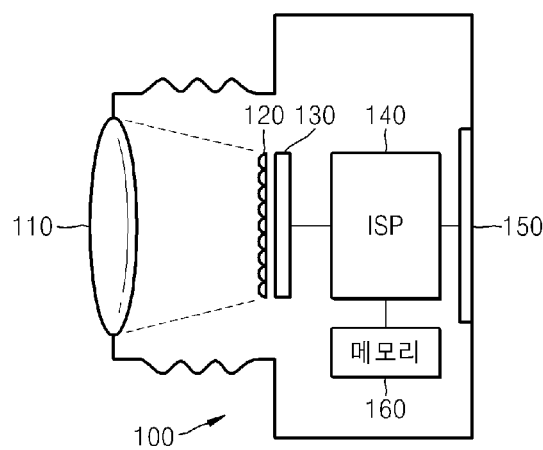
[Fig. 2]
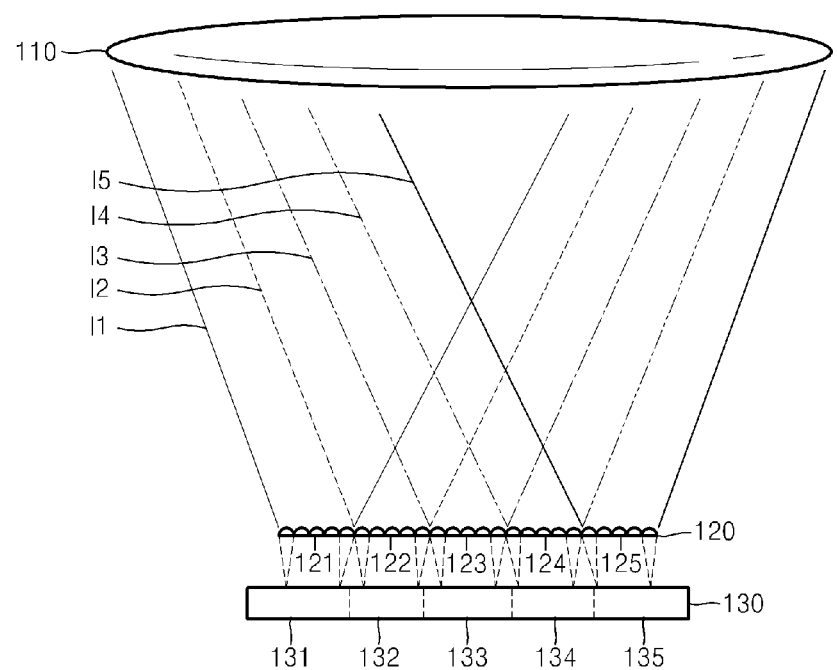
[Fig. 3a]
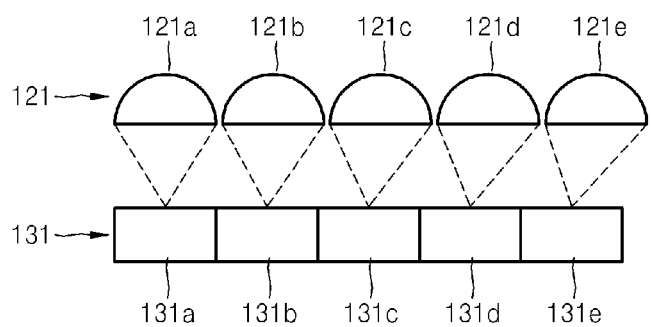

[Fig. 3b]
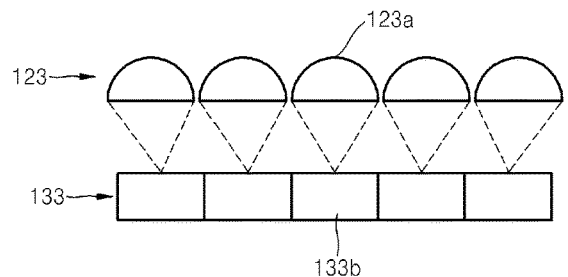
[Fig. 3c]
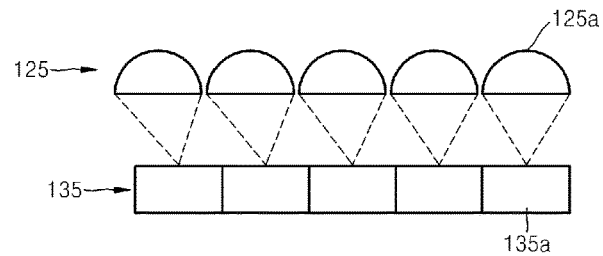
[Fig. 4]
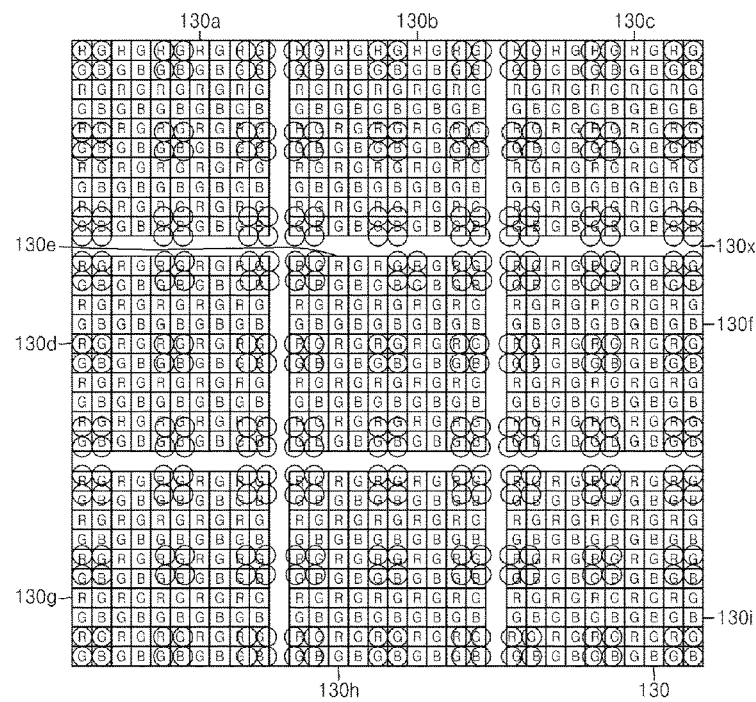
[Fig. 5]
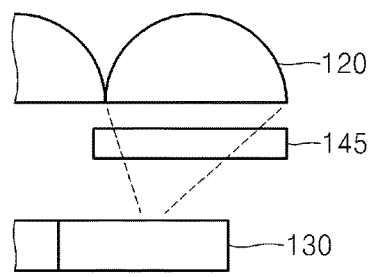

LIGHT FIELD IMAGE CAPTURING APPARATUS INCLUDING SHIFTED MICROLENS ARRAY

TECHNICAL FIELD

One or more embodiments of the present disclosure relate to light field image capturing apparatuses, and more particularly, to light field image capturing apparatuses including shifted microlens arrays.

BACKGROUND ART

As three-dimensional (3D) display apparatuses that may display depth images have been developed and their demands are increasing, 3D contents become significant. Thus, there is significant research directed towards a variety of 3D image capturing apparatuses in which a user himself/herself may manufacture 3D contents.

Methods of obtaining information regarding a distance from a 3D image capturing apparatus to an object may largely include active methods and passive methods. As a part of active methods, there are two representative methods, such as a time-of-flight (TOF) technique, whereby light is radiated onto the object and is reflected from an object and the light is detected so that a time for light movement may be determined, and triangulation whereby light is radiated by a plurality of light sources separated from a sensor and the position of light reflected from an object is detected so that a distance from the 3D image capturing apparatus to the object may be calculated. In addition, a representative passive method is a stereo camera method, whereby a distance from the 3D image capturing apparatus to the object may be calculated using image information captured by two or more cameras without actively radiating light. However, in active methods, both an additional light source and an additional optical system for radiating light onto the object are required, and in the passive stereo camera method, it is difficult to obtain precise distance information.

DISCLOSURE OF INVENTION

Technical Problem

Currently, a light field image capturing method has been suggested to obtain precise distance information without using an additional light source and an additional optical system. In the light field image capturing method, after images of a plurality of viewing points are captured at one time using a plurality of microlenses, the images are analyzed so as to extract depth information. For example, since the plurality of microlenses within a microlens array have slightly different viewing points that depend on their relative positions, a plurality of images captured from each of the microlenses may have different depths. Thus, a relative distance from the 3D image capturing apparatus and each object within each image may be precisely identified by analyzing the plurality of images.

Solution to Problem

Provided are light field image capturing apparatuses in which a plurality of microlenses within a microlens array are shifted with respect to pixels corresponding to the plurality of microlenses so that a plurality of overlapping images having different viewing points may be captured without using a complicated optical configuration.

Additional aspects will be set forth in part in the description which follows and, in part, will be apparent from the description, or may be learned by practice of the presented embodiments.

According to an aspect of an embodiment, an image capturing apparatus includes: an objective lens focusing light incident from an external object; an image sensor including a plurality of pixels, the image sensor outputting an image signal by detecting incident light; and a microlens array disposed between the objective lens and the image sensor and including a plurality of microlenses arranged in a two-dimensional manner, the plurality of microlenses corresponding to the plurality of pixels, wherein at least a part of the plurality of microlenses is shifted in a direction with respect to the pixels corresponding to the at least a part of the plurality of microlenses.

The image sensor may include a plurality of image capturing regions for capturing partial images having different viewing points, and the plurality of image capturing regions may be arranged in a two-dimensional matrix within the image sensor.

The microlens array may include a plurality of partial microlens array regions corresponding to the plurality of image capturing regions, and each of the plurality of partial microlens array regions may be configured to focus a partial image in an image capturing region corresponding to each partial microlens array region.

At least a part of the plurality of partial images captured in the plurality of image capturing regions may overlap each other.

Each image capturing region may include at least one matched region in which a position of a pixel and a position of a microlens corresponding to the pixel coincide with each other, and at least one unmatched region in which the microlens is shifted with respect to the pixel.

Positions of matched regions may be different from each other in the plurality of image capturing regions.

A position of a matched region in each image capturing region may correspond to a relative position of an image capturing region within the image sensor.

A matched region within the image capturing region in the center of the image sensor may be in the center of the image capturing region.

A microlens may be more shifted in a positive, first direction with respect to a pixel corresponding to the microlens from the matched region to the positive, first direction, a microlens may be more shifted in a negative, first direction with respect to a pixel corresponding to the microlens from the matched region to the negative, first direction, a microlens may be more shifted in a positive, second direction with respect to a pixel corresponding to the microlens from the matched region to the positive, second direction perpendicular to the first direction, and a microlens may be more shifted in a negative, second direction with respect to a pixel corresponding to the microlens from the matched region to the negative, second direction.

A gap may be formed between the plurality of image capturing regions of the image sensor, and pixels arranged in the image sensor corresponding to the gap may be dummy pixels that are not used.

The image sensor may be a color image sensor in which a plurality of pixels constitute one color pixel unit.

Relative position relationships between the plurality of pixels arranged within the same color pixel unit and a plurality of microlenses corresponding to the plurality of pixels may be the same.

The image sensor may include a plurality of color filters disposed between the plurality of pixels and the plurality of microlenses, and the color filter may be placed on a path of light that proceeds from each microlens to a pixel corresponding to each microlens.

Each microlens may have the same diameter as that of a width of a pixel, and a gap between two adjacent microlenses may be formed.

A distance between the objective lens and the image sensor may be smaller than a focal length of the objective lens.

The plurality of microlenses of the microlens array and the plurality of pixels of the image sensor may constitute one-to-one correspondence.

The image capturing apparatus may further include an image signal processor (ISP) that generates a final three-dimensional (3D) image using the image signal output from the image sensor.

According to an aspect of an embodiment, an image capturing apparatus includes an objective lens to focus light incident from an external object, an image sensor, including a plurality of pixels, to output an image signal by detecting incident light and a microlens array including a plurality of microlenses disposed between the objective lens and the image sensor, wherein each microlens of the plurality of microlenses is arranged to correspond to a predetermined pixel of the plurality of pixels and wherein at least one microlens of the plurality of microlenses is shifted with respect to a pixel corresponding to the at least one microlens.

According to an aspect of an embodiment, an image capturing apparatus includes an objective lens to focus light incident from an external object, an image sensor, including a plurality of pixels, to output an image signal by detecting incident light, and a microlens array including a plurality of microlenses disposed between the objective lens and the image sensor, wherein each microlens of the plurality of microlenses is arranged to correspond to a predetermined pixel of the plurality of pixels. The image sensor includes a matched region wherein each microlens of the plurality of microlenses in the matched region is aligned to coincide with a pixel corresponding to the microlens in the matched region and an unmatched region having at least one microlens of the plurality of microlenses in the unmatched region that is offset with respect to a pixel corresponding to the at least one microlens in the unmatched region.

A gap is formed between two adjacent image capturing regions each having at least one microlens that is offset with respect to a corresponding pixel.

the gap between the two adjacent image capturing regions is varied according to a degree of offset of the at least one microlens with respect to the corresponding pixel.

Pixels arranged in the image sensor corresponding to the gap are dummy pixels that are not used.

Advantageous Effects of Invention

According to the present embodiment, a plurality of microlenses within the microlens array 120 are shifted with respect to pixels corresponding to the plurality of microlenses so that a plurality of overlapping images having different viewing points may be easily captured without using a complicated optical configuration. As a result, in a light field image capturing apparatus according to the present embodiment, an existing image sensor, such as a charge-coupled device (CCD) or a complementary metal oxide semiconductor (CMOS), may be used without any modification. Thus, the configuration of an optical system and an image capturing unit of the light field image capturing apparatus may be simplified.

BRIEF DESCRIPTION OF DRAWINGS

FIG. 1 schematically illustrates the entire configuration of a light field image capturing apparatus according to an example embodiment;

FIG. 2 is a cross-sectional view schematically illustrating the structure and operation of an objective lens, a microlens array, and an image sensor of the light field image capturing apparatus illustrated in FIG. 1;

FIGS. 3a, 3b, and 3c are cross-sectional views schematically illustrating the position relationship between individual microlenses within a microlens array and pixels that are placed within an image sensor and that correspond to the individual microlenses in more detail;

FIG. 4 is a plan view schematically illustrating the position relationship between pixels within each image capturing region and microlenses when an image sensor has image capturing regions having a 3×3 arrangement; and FIG. 5 illustrates the position of a color filter disposed between a microlens and a pixel.

MODE FOR THE INVENTION

Reference will now be made in detail to embodiments, examples of which are illustrated in the accompanying drawings, wherein like reference numerals refer to like elements throughout. Sizes of elements in the drawings may be exaggerated for clarity and convenience of explanation. In this regard, the present embodiments may have different forms and should not be construed as being limited to the descriptions set forth herein. Accordingly, the embodiments are merely described below, by referring to the figures, to explain aspects of the present description.

FIG. 1 schematically illustrates the overall configuration of a light field image capturing apparatus according to an example embodiment. Referring to FIG. 1, a light field image capturing apparatus 100 according to the current embodiment may include, for example, an objective lens 110 that focuses light incident from an external object (not shown), an image sensor 130 including a plurality of pixels, wherein the image sensor 130 outputs an image signal by detecting incident light, and a microlens array 120 that is disposed between the objective lens 110 and the image sensor 130 and that includes a plurality of microlenses arranged in a two-dimensional grid-like manner. In addition, the plurality of pixels of the image sensor 130, may also be arranged in a two-dimensional grid-like manner. The light field image capturing apparatus 100 may further include, for example, an image signal processor (ISP) 140 for generating a final three-dimensional (3D) image using an image signal from the image sensor 130, a memory 160 in which an image may be stored, and a display panel 150 on which the image may be displayed.

In the present embodiment, a plurality of microlenses of the microlens array 120 and a plurality of pixels of the image sensor 130 may be arranged in a one-to-one correspondence. That is the plurality of microlenses, of the microlens array 120, in the two-dimensional grid may be disposed to correspond to the plurality of pixels, of the image sensor 130, in the two-dimensional grid. For example, each microlens may be disposed to correspond to each pixel.

Although not clearly shown in FIG. 1, the image sensor 130 may be divided into a plurality of image capturing regions for capturing partial images having different viewing points. For example, the image sensor 130 may include a plurality of image capturing regions arranged in a n×m (where n and m are integers greater than 1) matrix. Here, the term dividing or division may refer not to a physical division but rather to a logical division. For example, one image sensor 130 may be divided into several zones, and each zone may be used as an image capturing region. In this case, the image signal processor (ISP) 140 may identify a plurality of image capturing regions based on a coordinate of pixels within the image sensor 130 and may process image signals received from each image capturing region individually. In one or more embodiments, a plurality of image sensors each serving as one image capturing region may be used. A plurality of pixels and microlenses corresponding to the plurality of pixels may be disposed in each image capturing region. For example, the microlens array 120 may be divided into a plurality of array regions that correspond to a plurality of image capturing regions. The plurality of image capturing regions are disposed at relatively different positions with respect to the objective lens 110 and thus may have inherent viewing points that depend on their positions.

The image signal processor (ISP) 140 may generate a final image using a plurality of partial images captured in the plurality of image capturing regions and may extract distance information of objects within the final image. However, in order to precisely extract the distance information of objects within the final image using the image signal processor (ISP) 140, at least a part of a plurality of partial images may overlap each other. That is, visual fields of the plurality of adjacent image capturing regions should not be completely different and thus may overlap partially. As the degree of overlap between the partial images increases, distance information may be precisely extracted.

FIG. 2 is a cross-sectional view schematically illustrating the structure and operation of the objective lens 110, the microlens array 120, and the image sensor 130 of the light field image capturing apparatus 100 of FIG. 1. Referring to FIG. 2, the objective lens 110 condenses incident light toward the image sensor 130. A distance between the objective lens 110 and the image sensor 130 is shorter than a focal distance of the objective lens 110. That is, the image sensor 130 is placed between the objective lens 110 and the focal point of the objective lens 110. The microlens array 120 focuses light that is condensed by the objective lens 110, on the image sensor.

The image sensor 130 may include a plurality of image capturing regions 131, 132, 133, 134, and 135 for capturing partial images I1, I2, I3, I4, and I5 having different viewing points. The microlens array 120 may also be divided into a plurality of partial array regions 121, 122, 123, 124, and 125 that correspond to the plurality of image capturing regions 131, 132, 133, 134, and 135. For example, the first microlens array region 121 may focus the first partial image I1 in the first image capturing region 131, and the second microlens array regions 122 may focus the second partial image I2 in the second image capturing region 132. In this way, the first through fifth partial images I1, I2, I3, I4, and I5 may be focused in the first through fifth image capturing regions 131, 132, 133, 134, and 135. In FIG. 2, the light field image capturing apparatus 100 captures five partial images I1, I2, I3, I4, and I5. However, this is just an example, and embodiments are not limited thereto.

According to the present embodiment, at least a part of the plurality of partial images I1, I2, I3, I4, and I5 may overlap each other. For example, the first partial image I1 may include light that is incident from a left end to a middle right side of the objective lens 110, and the fifth partial image I5 may include light that is incident from a middle left to a right end of the objective lens 110. Thus, the first partial image I1 may most overlap the second partial image I2 that is closest to the first partial image I1 and may least overlap the fifth partial image I5 that is most distant from the first partial image I1.

In order to focus the plurality of partial images I1, I2, I3, I4, and I5 having different viewing points in the plurality of image capturing regions 131, 132, 133, 134, and 135 and in order to partially overlap the plurality of partial images I1, I2, I3, I4, and I5, at least a part of the plurality of microlenses of the microlens array 120 according to the present embodiment may be shifted to pixels corresponding to the part of the plurality of microlenses in a direction. For example, the first microlens array region 121 at the left side may be shifted to the right side with respect to the first image capturing region 131, and the fifth microlens array region 125 at the right side may be shifted to the left side with respect to the fifth image capturing region 135. A range of viewing angles of the partial images I1, I2, I3, I4, and I5 may vary according to a degree of shift. That is, as the degree of shift increases, the range of viewing angles of the partial images I1, I2, I3, I4, and I5 may be widened, and a degree of overlap between the partial images I1, I2, I3, I4, and I5 may increase.

FIGS. 3a, 3b, and 3c are cross-sectional views schematically illustrating the position relationship between individual microlenses within the microlens array 120 and pixels that are placed within the image sensor 130 and that correspond to the individual microlenses in more detail.

FIG. 3a shows the position relationship between the first microlens array region 121 and the first image capturing region 131 that are placed at the far-left side. In FIG. 3a, the first microlens array region 121 includes five microlenses 121a to 121e, and the first image capturing region 131 includes five pixels 131a to 131e. However, this is just an example, and embodiments are not limited thereto. Referring to FIG. 3a, a first pixel 131a at the far-left side in the first image capturing region 131 and a first microlens 121a at the far-left side in the first microlens array region 121 may be disposed so as to precisely coincide with each other. A second microlens 121b that is disposed second from the left side may be shifted slightly towards the right side compared to the second pixel 131b. That is, in one or more embodiments, a center point of the second microlens 121b may be shifted or offset slightly towards the right compared to a center point of the second pixel 131b. In this way, the degree of shift or offset of the microlens with respect to a pixel may gradually increase in a right direction. That is, the degree of shift or offset of the microlens in the right direction with respect to the pixel may gradually increase as each of the microlens and its respective pixel are disposed more towards the right direction. The degree of shift is illustrated in FIG. 3a where it can be seen that microlens 121e is shifted more to the right with respect to corresponding pixel 131e compared with microlens 121a and corresponding pixel 131a. Thus, the fifth microlens 121e that is disposed to the far-right side of the first microlens array region 121 may be shifted farthest to the right with respect to corresponding fifth pixel 131e, as compared to any other microlens and corresponding pixel illustrated in FIG. 3a.

Each of the microlenses 121a to 121e may have a diameter that is equal to a width of each of pixels 131a to 131e corresponding to the microlenses 121a to 121e. In this case, an interval between two adjacent microlenses 121a to 121e may be formed so as to implement the above-described shift.

That is, a pitch between the microlenses 121a to 121e may be greater than a diameter of each of the microlenses 121a to 121e. Alternatively, a diameter of each of the microlenses 121a to 121e may be slightly greater than a width of each of the pixels 131a to 131e.

FIG. 3b illustrates the position relationship between the third microlens region 123a and the third image capturing region 133 that are each disposed in the middle of the other microlenses and pixels, respectively. Referring to FIG. 3b, the microlens 123a placed in the middle of the third microlens array region 123 may be disposed to coincide with a pixel 133b placed in the middle of the third image capturing region 133. Microlenses disposed at the left side of the middle microlens 123a may be gradually shifted to the left side with respect to pixels corresponding to the microlenses, and microlenses disposed at the right side of the middle microlens 123 may be gradually shifted to the right side with respect to pixels corresponding to the microlenses.

FIG. 3c illustrates the position relationship between the fifth microlens array region 125a and the fifth image capturing region 135a that are placed at the far-right side. Referring to FIG. 3c, a pixel 135a at the far-right side in the fifth image capturing region 135 and a microlens 125a at the far-right side in the fifth microlens array region 125 may be disposed to precisely coincide with each other. The other microlenses disposed left of microlens 125a may be gradually shifted to the left side with respect to pixels corresponding to the other microlenses. That is, the degree of shift of the microlens in the left direction with respect to the corresponding pixel may gradually increase as each of the microlens and its respective pixel are disposed more towards the left direction. The degree of shift is illustrated in FIG. 3c where it can be seen that the far-left microlens 125 is shifted more to the left with respect to corresponding far-left pixel 135 compared with the far-right microlens 125 and corresponding far-right pixel 135.

According to the present embodiment, a plurality of microlenses within the microlens array 120 are shifted with respect to pixels corresponding to the plurality of microlenses so that a plurality of overlapping images having different viewing points may be easily captured without using a complicated optical configuration. As a result, in the light field image capturing apparatus 100 of FIG. 1, an existing image sensor 130, such as a charge-coupled device (CCD) or a complementary metal oxide semiconductor (CMOS), may be used without any modification. Thus, the configuration of an optical system and an image capturing unit of the light field image capturing apparatus 100 of FIG. 1 may be simplified.

Although FIGS. 3a through 3c illustrate microlenses shifted to the left side or the right side with respect to pixels corresponding to the microlenses, since the microlens array 120 and the image sensor 130 have a two-dimensional array, a part of the microlenses may be shifted upwardly and downwardly with respect to pixels corresponding to the part of the microlenses instead of or in addition to being shifted to the left or right side. For example, FIG. 4 is a plan view schematically illustrating the position relationship between pixels and microlenses within image capturing regions 130a to 130i in a 3×3 arrangement when the image sensor 130 has the image capturing regions 130a to 130i in the 3×3 arrangement.

In an embodiment of FIG. 4, the image capturing regions 130a to 130i may include pixels in a 10×10 arrangement, for example. Here, when the image sensor 130 is a color image sensor, pixels in a unit of a 2×2 arrangement may constitute one color pixel unit. For example, a red pixel R and a blue pixel B that are arranged in a first diagonal direction and two green pixels G arranged in a second diagonal direction that is perpendicular to the first diagonal direction may constitute one color pixel unit. In FIG. 4, microlenses corresponding to pixels are indicated in a circular form. In FIG. 4, not all of microlenses but rather some microlenses are selectively indicated for convenience of explanation. For example, in FIG. 4, 100 pixels are arranged in the image capturing regions 130a to 130i; however, 36 representative microlenses, which indicates positions of the microlenses, are shown in the image capturing regions 130a to 130i and 64 remainder microlenses are omitted. However, this is just an example and embodiments are not limited thereto.

Referring to FIG. 4, in a first image capturing region 130a at a left upper part of the image sensor 130, a microlens corresponding to a pixel at a top of the far-left may be disposed to coincide with a pixel corresponding to the microlens without shift. Hereinafter, a region in which the position of a pixel and the position of a microlens coincide with each other, is referred to a matched region, and a region in which a shift is disposed between the pixel and the microlens is referred to as a unmatched region. For example, in the first image capturing region 130a, four pixel regions at the top of the far-left form a matched region, and the other pixel regions are unmatched regions. A microlens may be shifted more in an x-direction with respect to a pixel corresponding to the microlens the farther the microlens is away from the matched region in the x-direction, and a microlens may be shifted more in a −y-direction with respect to a pixel corresponding to the microlens the farther the microlens is away from the matched region in the −y-direction. As illustrated in FIG. 4, the relative position relationships between four pixels arranged in the same color pixel unit and four microlenses corresponding to four pixels may be the same. In some embodiments, one microlens may include four pixels disposed within one color pixel unit.

In a second image capturing region 130b in a middle upper part of the image sensor 130, four pixel regions in a middle-top form a matched region, and the other pixel regions are unmatched regions. In the second image capturing region 130b, a microlens may be shifted more in the x-direction with respect to a pixel corresponding to the microlens the farther the microlens is away from the matched region in the x-direction, and a microlens may be shifted more in an −x-direction (negative x-direction) with respect to a pixel corresponding to the microlens the farther the microlens is away from the matched region in the −x-direction. Also, a microlens may be shifted more in the −y-direction (negative y-direction) with respect to a pixel corresponding to the microlens the farther the microlens is away from the matched region in the −y-direction.

In a third image capturing region 130c in a right upper part of the image sensor 130, four pixel regions at a right-top form a matched region, and the other pixel regions are unmatched regions. In the third image capturing region 130c, a microlens may be shifted more in the −x-direction with respect to a pixel corresponding to the microlens the farther the microlens is away from the matched region in the −x-direction, and a microlens may be shifted more in the −y-direction with respect to a pixel corresponding to the microlens the farther the microlens is away from the matched region in the −y-direction.

In a fifth image capturing region 130e in the middle of the image sensor 130, four pixel regions in the center form a matched region, and the other pixel regions are unmatched regions. In the fifth image capturing region 130e, a microlens may be shifted more in the x-direction with respect to a pixel corresponding to the microlens the farther the microlens is away from the matched region in the x-direction, and a microlens may be shifted more in an −x-direction with respect to a pixel corresponding to the microlens the farther the microlens is away from the matched region in the −x-direction. Also, a microlens may be shifted more with respect to a pixel corresponding to the microlens the farther the microlens is away from the matched region in the y-direction, and a microlens may be more shifted in the −y-direction with respect to a pixel corresponding to the microlens the farther the microlens is away from the matched region to the −y-direction.

Since the above description may be applied to the other image capturing regions 130d, 130f, 130g, 130h, and 130i, detailed descriptions of the image capturing regions 130d, 130f, 130g, 130h, and 130i will be omitted. As described above, each of the image capturing regions 130a to 130i may have at least one matched region. When the image sensor 130 is a color image sensor, each matched region may include four pixels within one color pixel unit. As illustrated in FIG. 4, the position of the matched region may vary according to the image capturing regions 130a to 130i. In more detail, the position of the matched region in each of the image capturing regions 130a to 130i may correspond to the positions of the image capturing regions 130a to 130i within the image sensor 130. For example, a matched region in the first image capturing region 130a at a left upper part of the image sensor 130 is placed in a left upper part within the first image capturing region 130a. Also, a matched region within the fifth image capturing region 130e in the center of the image sensor 130 is placed in the center of the fifth image capturing region 130e.

All regions other than the matched region in the image capturing regions 130a to 130i are unmatched regions, and microlenses in the unmatched regions may be shifted differently according to positions of the image capturing regions 130a to 130i. Generally, a microlens may be shifted more in the x-direction with respect to a pixel corresponding to the microlens the farther the microlens is away from the matched region in the x-direction, and a microlens may be shifted more in the −x-direction with respect to a pixel corresponding to the microlens the farther the microlens is away from the matched region in the −x-direction. Also, a microlens may be shifted more in the y-direction with respect to a pixel corresponding to the microlens the farther the microlens is away from the matched region in the y-direction, and a microlens may be shifted more in the −y-direction with respect to a pixel corresponding to the microlens the farther the microlens is away from the matched region in the −y-direction. That is, the greater the distance of a microlens and corresponding pixel in an unmatched region from a matched region, the greater the shift between the microlens and its corresponding pixel in the unmatched region. The direction of the shift between the microlens and its corresponding pixel in the unmatched region is generally the same as the direction in which the unmatched region is disposed in comparison with the matched region.

Microlenses individually shifted in the image capturing regions 130a to 130i may interfere between the image capturing regions 130a to 130i. For example, a microlens shifted in a +x-direction in the first image capturing region 130a and a microlens shifted in a −x-direction in the second image capturing region 130b may interfere with each other. Thus, in order to prevent microlenses from interfering between two adjacent image capturing regions of the image capturing regions 130a to 130i, a gap 130x between two of the adjacent image capturing regions 130a to 130i may be formed. The gap 130x between two of the image capturing regions 130a to 130i may vary according to a degree of shift of the microlens. In this case, pixels arranged within the image sensor 130 which correspond to the gap 130x become dummy pixels. For example, in one or more embodiments a dummy pixel is a non-functioning pixel or a pixel that is not used.

When the image sensor 130 is a color image sensor, a color filter may be disposed in each pixel. The color filter may be disposed between the pixel surface of the image sensor 130 and the microlens array 120. According to the present embodiment, since microlenses are shifted with respect to pixels corresponding to the microlenses, the position of the color filter may be adjusted according to the positions of the microlenses. FIG. 5 illustrates the position of the color filter disposed between the microlens and the pixel. As illustrated in FIG. 5, for example, when a microlens 129 is shifted to the right with respect to a pixel 139 corresponding to the microlens 129, a color filter 145 disposed between the microlens 129 and the pixel 139 may also be shifted to the right with respect to a pixel 139. A degree to which the color filter 145 is shifted may vary according to a distance between the microlens 129 and the color filter 145. For example, when the color filter 145 is directly disposed on the top surface of the pixel 139 without a gap, the color filter 145 may not be shifted. On the other hand, when the color filter 145 is disposed on the bottom surface of the microlens 129 without forming any gap, the color filter 145 is shifted to the same degree as that of the microlens 129. In either case, the position of the color filter 145 may be adjusted in such a way that the color filter 145 may be placed on a path of light that proceeds from the microlens 129 to the pixel 139 corresponding to the microlens 129.

It should be understood that the exemplary embodiments described therein should be considered in a descriptive sense only and not for purposes of limitation. Descriptions of features or aspects within each embodiment should typically be considered as available for other similar features or aspects in other embodiments.

The invention claimed is:
1. An image capturing apparatus comprising:
an objective lens configured to focus light incident from an external object;
an image sensor, including a plurality of pixels, the image sensor configured to output an image signal based on detecting the focused incident light, the image sensor including a plurality of image capturing regions configured to capture a plurality of partial images having different viewing points, the image sensor including a two-dimensional matrix that includes the plurality of image capturing regions, at least a part of each partial image of the plurality of partial images captured in the plurality of image capturing regions overlapping another partial image of the plurality of partial images; and
a microlens array between the objective lens and the image sensor, the microlens array including a two-dimensional array of a plurality of microlenses, each microlens of the plurality of microlenses corresponding to a separate pixel of the plurality of pixels,
wherein a microlens of the plurality of microlenses is offset with respect to the separate pixel corresponding to the microlens.

2. The image capturing apparatus of claim 1, wherein
the microlens array includes a plurality of partial microlens array regions corresponding to the plurality of image capturing regions, and
each partial microlens array region of the plurality of partial microlens array regions is configured to focus a partial image in a separate image capturing region corresponding to the partial microlens array region.

3. The image capturing apparatus of claim 1, wherein
each image capturing region of the plurality of image capturing regions includes
at least one matched region in which a position of a pixel of the matched region and a position of a microlens corresponding to the pixel of the matched region are arranged to coincide with each other, and
at least one unmatched region in which the microlens is shifted with respect to a pixel, of the unmatched region, which corresponds to the microlens.

4. The image capturing apparatus of claim 3, wherein positions of matched regions are different from each other in the plurality of image capturing regions.

5. The image capturing apparatus of claim 4, wherein a position of a matched region in each image capturing region corresponds to a relative position of an image capturing region within the image sensor.

6. The image capturing apparatus of claim 5, wherein a matched region within the image capturing region in a center of the image sensor is in a center of the image capturing region.

7. The image capturing apparatus of claim 3, wherein
a first microlens is shifted in a positive first direction with respect to a pixel corresponding to the first microlens in proportion to a distance between the first microlens and the matched region in the positive first direction,
a second microlens is shifted in a negative first direction with respect to a pixel corresponding to the second microlens in proportion to a distance between the second microlens and the matched region in the negative first direction,
a third microlens is shifted in a positive second direction with respect to a pixel corresponding to the microlens in proportion to a distance between the third microlens and the matched region in the positive second direction perpendicular to the positive first direction, and
a fourth microlens is shifted in a negative second direction with respect to a pixel corresponding to the microlens in proportion to a distance between the fourth microlens and the matched region in the negative second direction.

8. The image capturing apparatus of claim 1, further comprising:
a gap is between the plurality of image capturing regions of the image sensor,
wherein pixels corresponding to the gap in the image sensor are dummy pixels that are not used, and
wherein the gap is varied according to a degree of offset of a microlens of the plurality of microlenses with respect to the separate pixel corresponding to the microlens.

9. The image capturing apparatus of claim 1, wherein the image sensor is a color image sensor in which the plurality of pixels constitute one color pixel unit.

10. The image capturing apparatus of claim 9, wherein relative position relationships between the plurality of pixels arranged within a common color pixel unit and a plurality of microlenses corresponding to the plurality of pixels are common.

11. The image capturing apparatus of claim 9, wherein
the image sensor includes a plurality of color filters between the plurality of pixels and the plurality of microlenses, and
each color filter of the plurality of color filters is on a path of light that proceeds from a separate microlens to a separate pixel corresponding to the separate microlens.

12. The image capturing apparatus of claim 1, wherein
each microlens of the plurality of microlenses has a diameter that is equal to a width of a pixel, and
the image capturing apparatus includes a gap between two adjacent microlenses of the plurality of microlenses.

13. The image capturing apparatus of claim 1, wherein a distance between the objective lens and the image sensor is smaller than a focal length of the objective lens.

14. The image capturing apparatus of claim 1, wherein a one-to-one correspondence exists between the plurality of microlenses of the microlens array and the plurality of pixels of the image sensor.

15. The image capturing apparatus of claim 1, further comprising:
an image signal processor (ISP) configured to generate a final three-dimensional (3D) image using the image signal output from the image sensor.

16. An image capturing apparatus comprising:
an objective lens configured to focus light incident from an external object;
an image sensor, including a plurality of pixels, the image sensor configured to output an image signal based on detecting the focused incident light; and
a microlens array including a plurality of microlenses between the objective lens and the image sensor, wherein each microlens of the plurality of microlenses corresponds to a particular pixel of the plurality of pixels,
wherein the image sensor includes:
a plurality of image capturing regions configured to capture a plurality of partial images having different viewing points, each image capturing region including a microlens that is offset with respect to a separate pixel corresponding to the microlens,
a gap between two adjacent image capturing regions of the plurality of image capturing regions, wherein the gap is varied according to a degree of offset of the microlens with respect to the separate pixel corresponding to the microlens,
a matched region wherein each microlens of the plurality of microlenses in the matched region is aligned to coincide with a pixel corresponding to the microlens in the matched region; and
an unmatched region having at least one microlens of the plurality of microlenses in the unmatched region that is offset with respect to a pixel corresponding to the at least one microlens in the unmatched region.

* * * * *